(12) United States Patent
Ohshima et al.

(10) Patent No.: US 6,705,730 B2
(45) Date of Patent: Mar. 16, 2004

(54) PICTURE DISPLAY DEVICE

(75) Inventors: Tetsuya Ohshima, Tokyo (JP); Hiroki Kaneko, Hitachi (JP); Kazutaka Tsuji, Hachioji (JP); Akira Arimoto, Fuchu (JP); Osamu Ebina, Atsugi (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 09/942,724

(22) Filed: Aug. 31, 2001

(65) Prior Publication Data

US 2003/0020878 A1 Jan. 30, 2003

(30) Foreign Application Priority Data

Jul. 24, 2001 (JP) .......................... 2001-222593

(51) Int. Cl.[7] .............................................. G03B 21/00
(52) U.S. Cl. ................................ 353/7; 348/51; 353/31
(58) Field of Search .............................. 353/7, 10, 30, 353/31, 94; 359/475, 476, 477, 462, 466, 472, 478, 479; 348/42, 46, 51, 798

(56) References Cited

U.S. PATENT DOCUMENTS

| | | | | |
|---|---|---|---|---|
| 4,277,137 A | * | 7/1981 | Upatnieks et al. | 359/560 |
| 4,329,019 A | * | 5/1982 | Okoshi et al. | 359/459 |
| 5,125,733 A | * | 6/1992 | Lee | 353/7 |
| 5,993,003 A | * | 11/1999 | McLaughlin | 353/7 |
| 6,040,946 A | * | 3/2000 | Hebert | 359/630 |
| 6,286,961 B1 | * | 9/2001 | Ogawa | 353/38 |
| 6,314,210 B1 | * | 11/2001 | Fukushima et al. | 382/280 |
| 6,323,999 B1 | * | 11/2001 | Ueda et al. | 359/443 |
| 6,329,963 B1 | * | 12/2001 | Chiabrera et al. | 345/6 |
| 6,330,111 B1 | * | 12/2001 | Myers | 359/599 |
| 6,416,181 B1 | * | 7/2002 | Kessler et al. | 353/7 |

FOREIGN PATENT DOCUMENTS

| | | |
|---|---|---|
| JP | 2000-069505 | 8/1998 |
| JP | 2000-056410 | 6/1999 |

* cited by examiner

*Primary Examiner*—Russell Adams
(74) *Attorney, Agent, or Firm*—Reed Smith LLP; Stanley P. Fisher, Esq.; Juan Carlos A. Marquez, Esq.

(57) ABSTRACT

It is an object of the present invention to implement a display providing high optical efficiency irrespective of the size of a light valve, and capable of enhancing the uniformity of the luminance of an image to be projected. In order to attain the foregoing object, for example, as shown in FIG. 1, a light valve 103 of a projector is located roughly at the focus point of an illumination lens 102. Further, as shown in FIG. 2, a light source 101 is also located roughly at the focus point of the illumination lens 102. Consequently, it is possible to implement a miniaturized projector.

23 Claims, 7 Drawing Sheets

PICTURE DISPLAY DEVICE

BACKGROUND OF THE INVENTION (1) Field of the Invention

The present invention relates to a picture display using an area light source such as a light-emitting diode array. More particularly, it relates to a picture display suitable for a stereoscopic display which makes it possible to watch three-dimensional images using binocular disparity by performing projection on the same screen by using a left and right pair of projectors without using special glasses.

(2) Description of the Prior Art

In general, a device configuration whereby a light valve is illuminated, and a modulated image signal is projected through a projection lens onto a screen is referred to as a projector. A device including this projector and a screen is referred to as a picture display.

A picture display using an area light source such as a light-emitting diode array is disclosed in the art, for example, Japanese Laid-Open Patent Publication No. 2000-56410. The projector herein shown is so configured that a luminous flux emitted from an area light source illuminates an light valve such as an LCD, and a modulated image signal is projected through a projection lens onto a screen. Further, with this picture display, the light beams emitted from red, green, and blue three color light sources are subjected to color recombination on a screen, thereby to perform color display by a single light valve, resulting in a lower cost.

With the prior-art picture display, a collimated luminous flux is emitted form each area light source. Therefore, when the area light source does not match in size with the light valve, i.e., when the luminous flux is smaller than the area of the light valve, there occur non-illuminated portions in the light valve to cause a picture defect. In contrast, when the luminous flux is larger than the area of the light valve, there occurs an ineffective luminous flux not incident upon the light valve, resulting in a reduced optical efficiency.

Further, with the prior art described above, the luminance uniformity of each area light source nearly matches with the luminous flux which illuminates the light valve. Accordingly, there has occurred the following problem. Namely, if light emissions from respective area light sources are not uniform, the light valve is unevenly illuminated. As a result, a lack of luminance uniformity occurs in a projected image. Further, the area light source itself is required to have a more higher mechanics in order to achieve the evenness of the luminance uniformity of the area light source.

SUMMARY OF THE INVENTION

In view of the foregoing circumstances, it is therefore an object of the present invention to enhance the optical efficiency regardless of the size of a light valve, and enhance the uniformity of the luminance of a projected image in a display using an area light source.

The present inventors have conducted various experiments and studies to attain the foregoing object. As a result, they have obtained the following unexpected finding. In general, this type of display is made up of a projector, and a screen for displaying a projected image projected from the projector. In the projector, an illumination lens is disposed between a light source and a light valve. In such a configuration, if the light valve is at least positioned roughly at the focus point of the illumination lens, extremely favorable results are obtained with respect to both the optical efficiency and the uniformity of the luminance of an image projected onto the screen.

Further, they have also obtained the following important finding. Namely, if the light source is also located at a position in a symmetrical relation to the light valve with respect to the illumination lens centrally interposed therebetween, and roughly at the focus point of the illumination lens, further more favorable results can be obtained.

The present invention has been completed based on such important findings. Below, the features of the display in accordance with the present invention will be described.

A display in accordance with a first aspect of the present invention in order to attain the foregoing object, comprises: a projector including a light source extending at least one-dimensionally or two-dimensionally, an illumination lens through which a luminous flux emitted from the light source passes, a light valve for modulating the luminous flux passed through the illumination lens, and a projection lens for projecting the luminous flux modulated at the light valve; and a screen for displaying a projected image projected by the projection lens of the projector, and it is characterized in that the light valve of the projector is located roughly at a focus point f of the illumination lens.

A display in accordance with a second aspect of the present invention in order to attain the foregoing object, is characterized in that the light source is located roughly at the opposite focus point of the illumination lens from the focus point on which the light valve is located.

A stereoscopic display in accordance with a third aspect of the present invention in order to attain the foregoing object, comprises: a left and right pair of projectors each including a light source extending at least one-dimensionally or two-dimensionally, an illumination lens through which a luminous flux emitted from the light source passes, a light valve for modulating the luminous flux passed through the illumination lens, and a projection lens for projecting the luminous flux modulated at the light valve; and a screen for displaying respective projected images projected by the projection lenses of the pair of the projectors on the same panel, and it is characterized in that the light valve of each of the projectors is located roughly at a focus point f of the illumination lens.

As described above, the light valve, and further the light source are respectively positioned roughly at the focus points f of the illumination lens. This is attributable to the following fact. Namely, if the deviation from the focus point f is within about ±25% range, although a little difference occurs in terms of its effects, the shift does not matter in terms of practicality, and is acceptable.

Further, in the case where the area of the light source is large, satisfying the relationship of the following expression (7):

$$W > 1.2 f/Fn \qquad (7)$$

where Fn denotes the F-number of the projection lens, f denotes the focal length of the illumination lens, and W denotes the diameter of the light source, the light source can be positioned at a distance in the range of from zero to 3.5 times the focal length f of the illumination lens away from the illumination lens.

In the case where the area of the light source is small, satisfying the relationship of the following expression (8):

$$W \leq 1.2 f/Fn \qquad (8)$$

the light source can be positioned at a distance of the focal length f of the illumination lens with a deviation within the −40% to +80% range away from the illumination lens.

DESCRIPTION OF THE PREFERRED EMBODIMENTS

Figure 8:
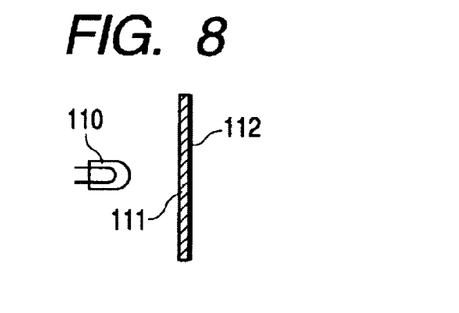
FIG. 8 is a schematic diagram for showing a light source to be used for the projector of the present invention.
Figure 9:
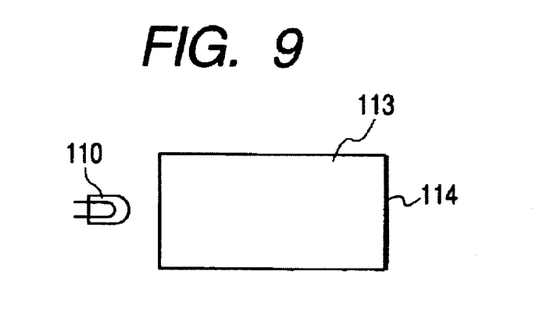
FIG. 9 is a schematic diagram for showing a light source to be used for the projector of the present invention.
Figure 10:
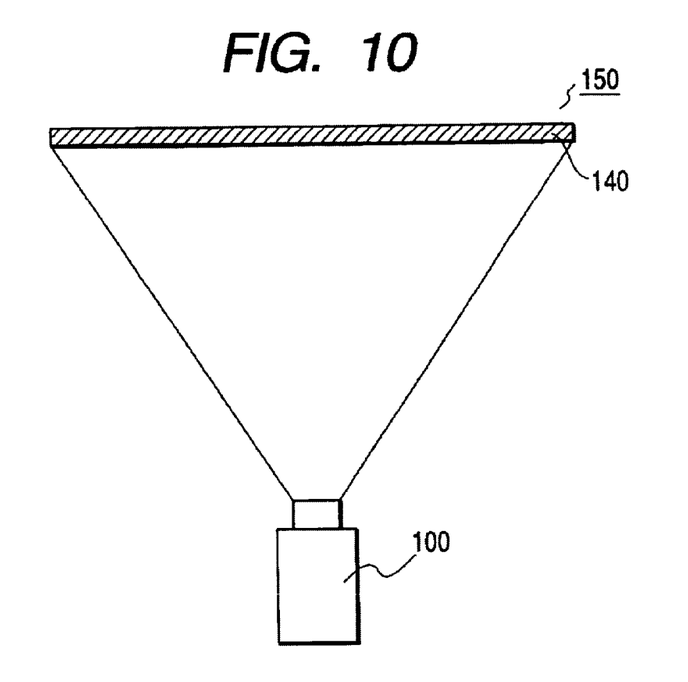
FIG. 10 is a schematic diagram (top view) for showing the configuration of a display of the present invention.
Figure 11:
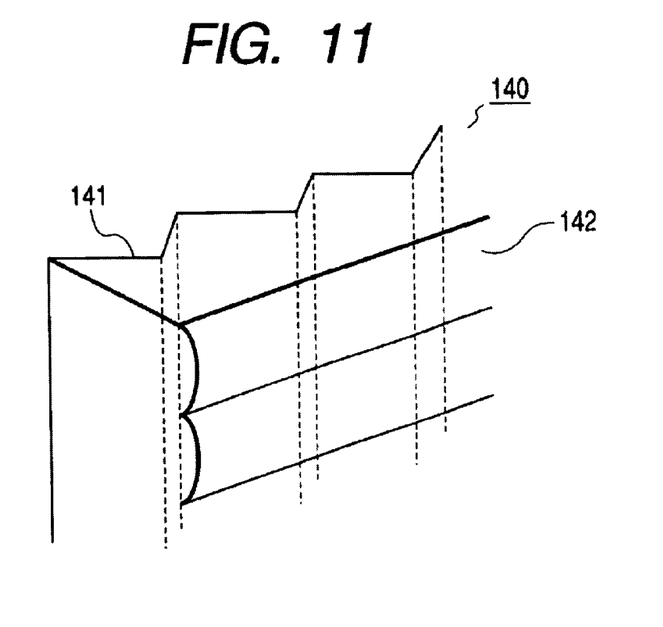
FIG. 11 is a schematic diagram for showing the structure of a directional reflection screen to be used for the display of the present invention.

Below, the general outline of the present invention will be described by reference to drawings. FIGS. 1 to 5 show optical systems of respective projectors 100 having mutually different configurations; FIGS. 6 to 9 show light sources 101 having mutually different configurations; FIG. 10 shows a display 150; and FIG. 11 shows a schematic diagram of a screen constituting the display 150.

Figure 1:
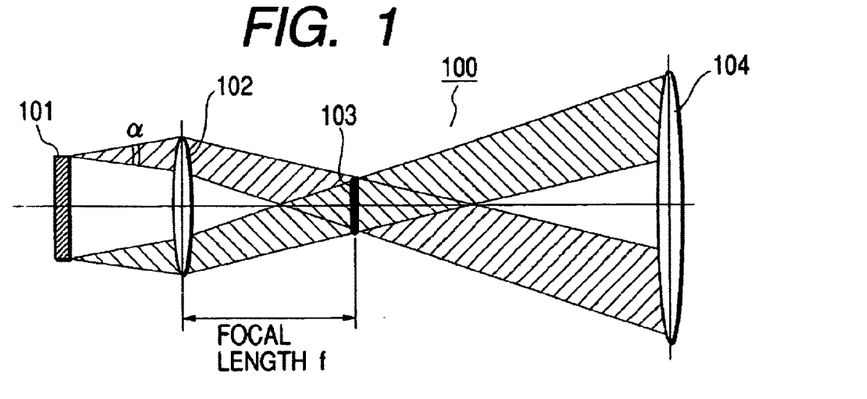
FIG. 1 is a schematic diagram for showing the configuration of an optical system of a projector of the present invention.

FIG. 1 shows one example of an optical system of the projector 100 constituting the display 150 of the present invention. The display of the present invention is so configured that a screen not shown is provided at a position opposed to a projection lens of the projector 100.

As shown in FIG. 1, the projector constituting the display of the present invention is made up of a light source 101, an illumination lens 102 through which a luminous flux emitted from the light source 101 passes, a light valve 103 for modulating the luminous flux passed through the illumination lens 102, and a projection lens 104 for projecting the luminous flux modulated by the light valve 103.

Herein, the light source 101 is an area light source of which the light-emitting surface extends one-dimensionally or two-dimensionally. Further, the light valve 103 is located on the focus point of the illumination lens 102. Therefore, all the luminous fluxes emitted from respective points of the area light source 101 pass through the light valve 103 for efficient illumination.

In the projector, the whole surface of the light valve is required to be illuminated for preventing an image defect from occurring in a projected image. For this reason, in the projector of the present invention, the luminous flux emitted from each point of the area light source 101 is required to be extended. The extent of the luminous flux from each point, i.e., angle of radiation $\alpha$ may be large enough to illuminate the whole surface of the light valve 103.

Therefor, $\alpha$ may satisfy the relationship of the following expression:

$$\alpha \geq \arctan(d/2f) \tag{1}$$

where d represents the width of the light valve 103, and f represents the focal length of the illumination lens 102. Herein, in order for the light valve to be illuminated most efficiently, the relationship of the following expression may be satisfied:

$$\alpha = \arctan(d/2f) \tag{2}$$

In general, the light valve has the shape of rectangle, and the width in the horizontal direction is different from the width in the vertical direction. Thus, it is more preferable that the angles of radiation are also independently set for the horizontal and vertical directions. In this case, the relationship of the following expression may be satisfied:

$$\alpha H \geq \arctan(dH/2f) \tag{3}$$

where dH represents the horizontal width of the light valve, and $\alpha H$ represents the angle of radiation in the horizontal direction at each point of the light source.

Further, the relationship of the following expression may be satisfied:

$$\alpha V \geq \arctan(dV/2f) \tag{4}$$

where dV represents the vertical width of the light valve, and $\alpha V$ represents the angle of radiation in the vertical direction at each point of the light source.

Herein, in order for the light valve to be illuminated most efficiently, the relationships of the following expressions may be satisfied:

$$\alpha H = \arctan(dH/2f) \tag{5}$$

$$\alpha V = \arctan(dV/2f) \tag{6}$$

In general, the irradiated area is designed to be larger than the light valve by about 10% allowing for a manufacturing error. In this case, it is needless to say that the width d, the horizontal width dH, and the vertical width dV of the light valve in the expressions (2) to (6) may be replaced with the width, the horizontal width, and the vertical width of the irradiated surface which has allowed for a manufacturing error.

Whereas, for the position of the light source 103, as shown in FIG. 1, if it is close to the illumination lens 102, the luminous fluxes emitted from respective points on the light source 103 extend, so that there occur some luminous fluxes not entering the projection lens 104. On the other hand, if it is distant from the illumination lens 102, the luminous fluxes converge, so that the number of luminous fluxes not entering the projection lens 104 is reduced, but the device is increased in size.

Figure 2:
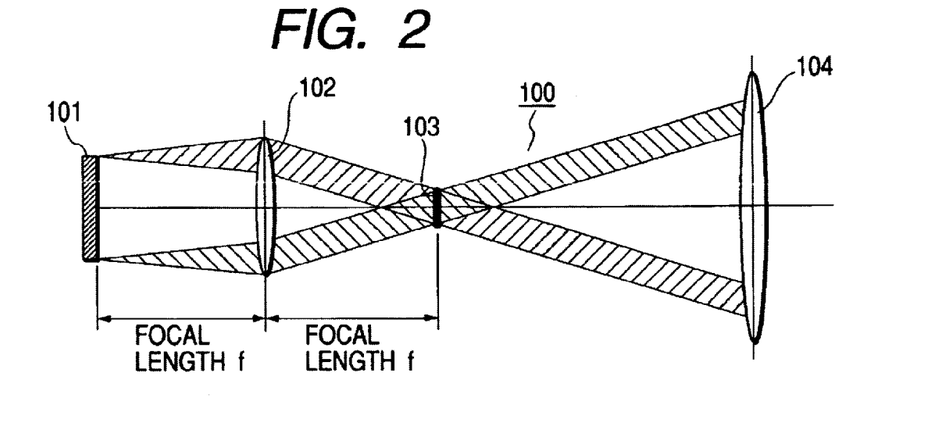
FIG. 2 is a schematic diagram for showing the configuration of an optical system of a projector of the present invention.

Therefore, as shown in the optical system of FIG. 2, the light source 101 is preferably located at the opposite focus point of the illumination lens 102 from the focus point on which the light valve 103 is located.

The light valve 103 may be a transmissive light valve such as a transmissive LCD as shown in FIGS. 1 and 2. Alternatively, it may also be a reflective light valve such as a digital micromirror device, or a reflective LCD using a polarizing beam splitter 105 as shown in an optical system of FIG. 3.

Figure 3:
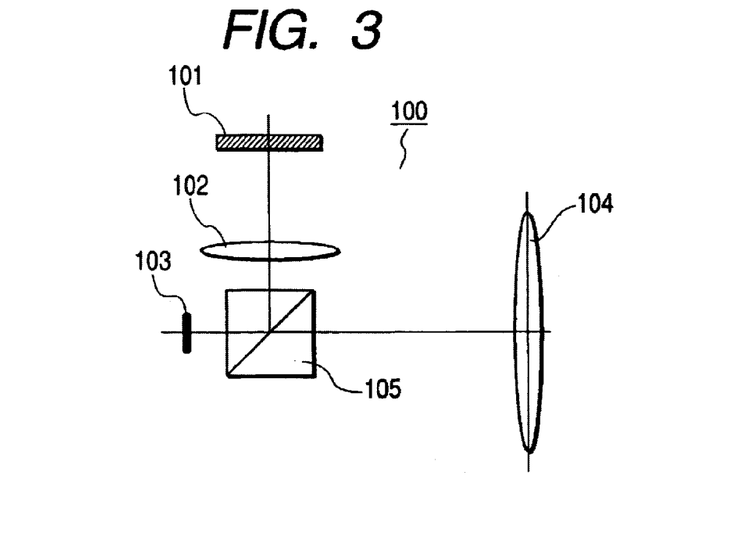
FIG. 3 is a schematic diagram for showing the configuration of an optical system of a projector of the present invention.
Figure 4:
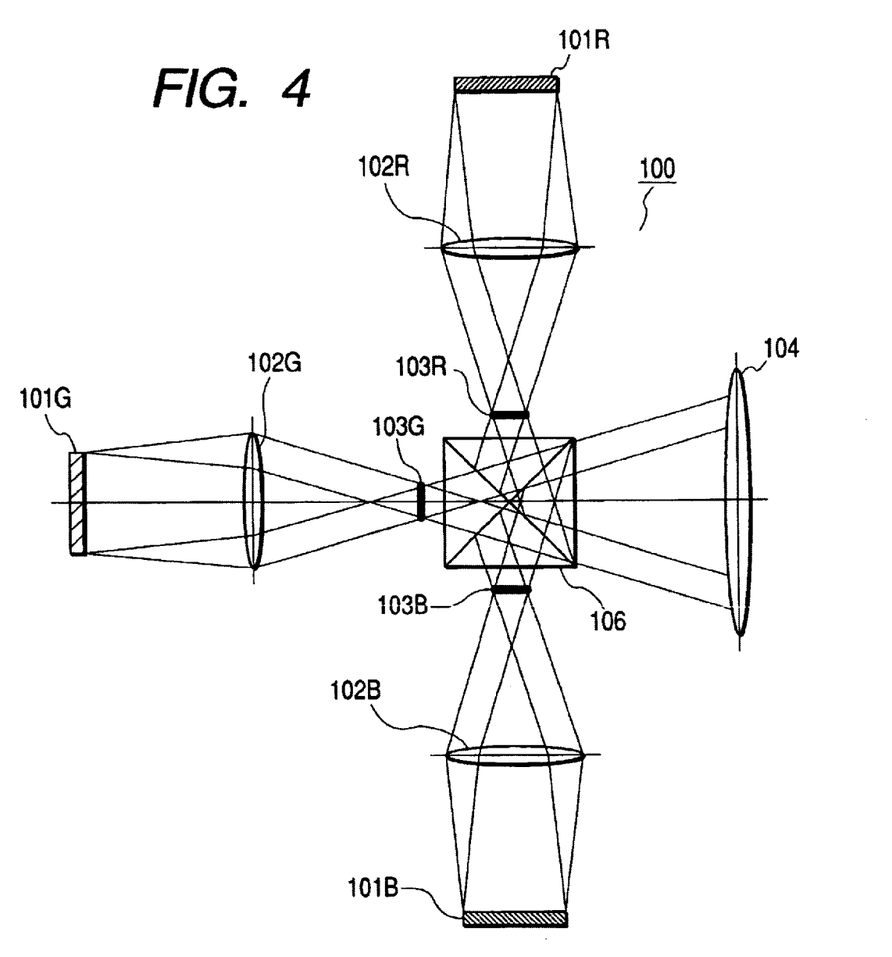
FIG. 4 is a schematic diagram for showing the configuration of an optical system of a projector of the present invention.
Figure 5:
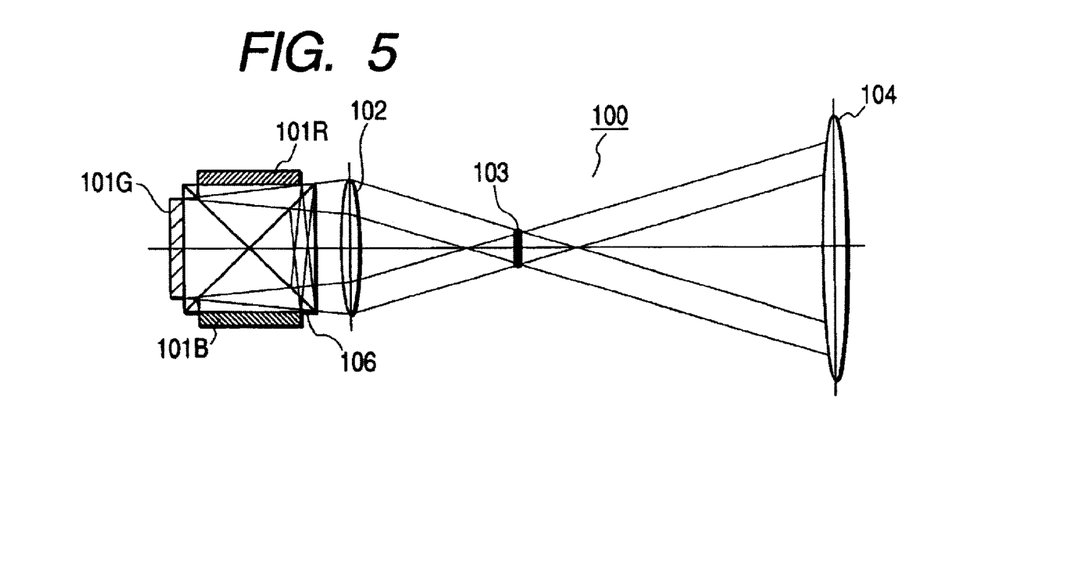
FIG. 5 is a schematic diagram for showing the configuration of an optical system of a projector of the present invention.

For color display, the light source 101 is required to have red, green, and blue three color light-emitting portions. However, as shown in FIGS. 1, 2, and 3, such portions may also be integrated in one area light source. Alternatively, as shown in FIGS. 4 and 5, the light source 101 may be divided into three parts of a red light source 101R, a green light source 101G, and a blue light source 101B. Incidentally, in FIGS. 4 and 5, a reference numeral 106 denotes a dichroic cross prism.

Figure 6:
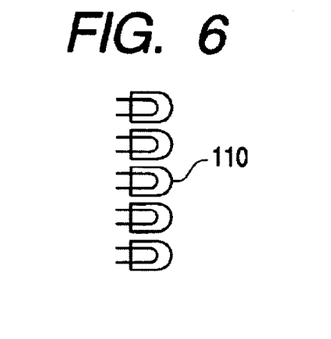
FIG. 6 is a schematic diagram for showing a light source to be used for the projector of the present invention.
Figure 7:
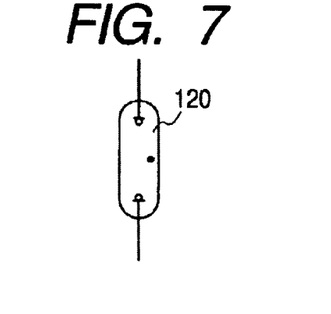
FIG. 7 is a schematic diagram for showing a light source to be used for the projector of the present invention.

These light sources usable may be small light sources each having a small light-emitting area such as light-emitting diodes (LED) 110 integrated in an array as shown in FIG. 6, or the extended light sources such as a fluorescent lamp 120 as shown in FIG. 7, and the like.

Further, the light source which can be substantially regarded as an area light source even if it is not a surface-like light source in actuality is also applicable. Examples thereof include a diffusion surface 112 when luminous fluxes emitted from a light source such as a light-emitting diode are made incident upon a diffuser 111 made up of a transparent substrate including a micro-lens array or a diffusion material therein as shown in FIG. 8, and an aperture 114 of an integrator 113 made up of a reflector in the form of cylinder or prism as shown in FIG. 9.

In order to further reduce the lack of luminance uniformity of a projected image by the projector 100, the light valve is required to be uniformly illuminated. For this reason, in the projector of the present invention, the radiation angle distributions of respective points of a light source are required to be made uniform. Herein, when light-emitting diodes are arranged in an array to be used as a light source, the uniformity of the image is determined by the radiation distribution of each light-emitting diode element.

Figure 13:
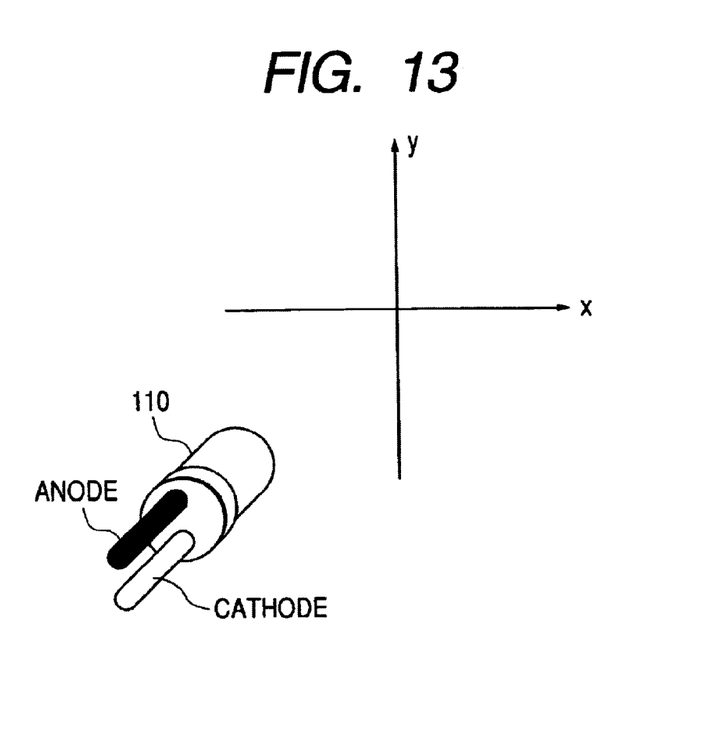
FIG. 13 is a diagram for illustrating the radiation angle anisotropy of a light-emitting diode element.
Figure 14:
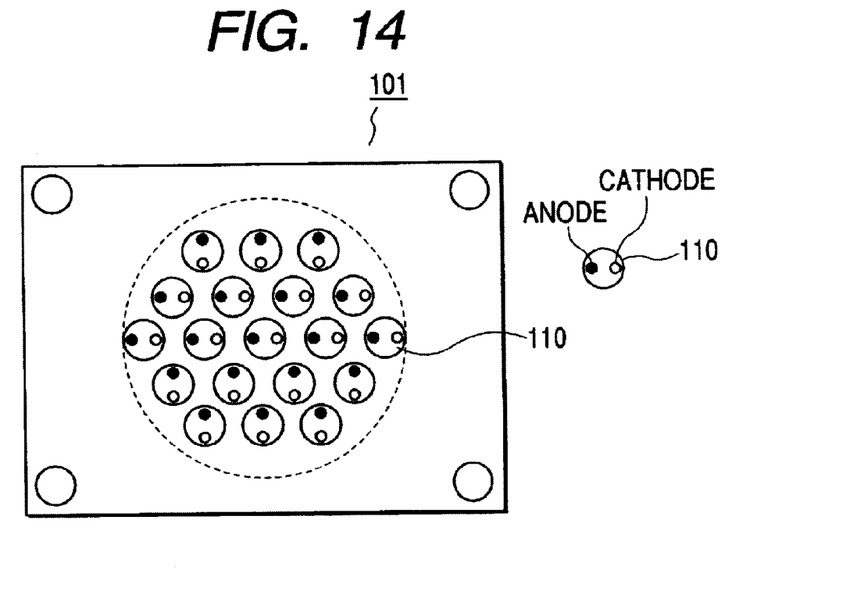
FIG. 14 is a schematic diagram for showing a light-emitting diode array light source to be used for the projector of the present invention.

In general, the radiation angle distribution of a light-emitting diode has an anisotropy. When the light-emitting diode is caused to emit light, the radiation distribution differs between the X direction and the Y direction of FIG. 13, causing the lack of luminance uniformity of the projected image. In order to reduce the lack, the light-emitting diodes 110 constituting the light source, specifically, direction of the anodes and the cathodes in the array light source surface may be arranged so that at least two or more directions thereof are mutually different. For example, it is preferable that respective light-emitting diodes are integrated so as to be in two directions orthogonal to each other as shown in FIG. 14.

By using each of the projectors described above in combination with a reflective or transmissive screen, it is possible to form a front projection type or back projection type of display 150. For example, for the front projection type of a display, the projector may be used in combination with a reflective screen as shown in FIG. 10.

Herein, for example, if a directional reflection screen made up of a corner reflector 141 and an anisotropic diffusion mean 142 having different diffusion angles between the horizontal direction and the vertical direction is used as the screen 140 as shown in FIG. 11, it is possible to obtain a display whereby a high-luminance image is viewable within a restricted range.

Herein, the anisotropic diffusion mean 142 may be integrated with the corner reflector in one body so that wider diffusion occurs in a direction parallel to the ridgeline of the corner reflector than in the vertical direction. Further, the anisotropic diffusion mean 142 may also be a lenticular as shown in FIG. 11. Alternatively, any of a micro-lens array, a holographic optical element, or the like is also usable.

Figure 12:
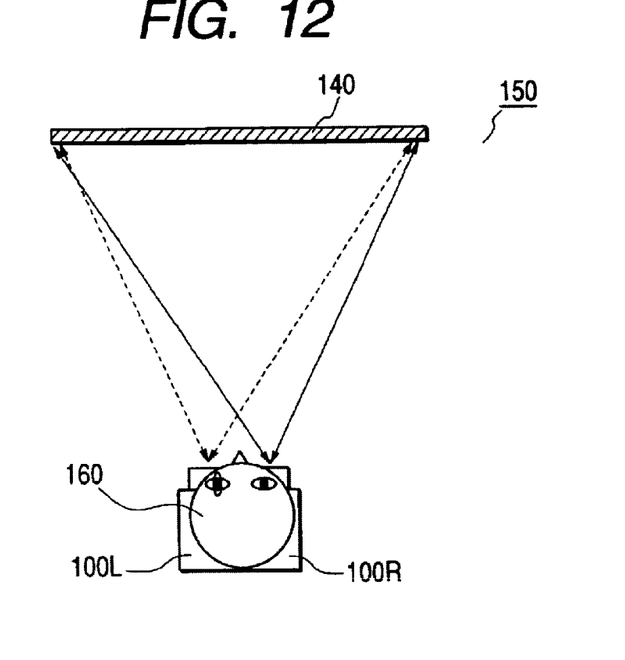
FIG. 12 is a schematic diagram (top view) for showing the configuration of a display of the present invention.

Further, by using such a directional reflection screen 140 in combination with two projectors 100R and 100L respectively for the right eye and the left eye, and projecting images causing binocular disparity from respective projectors, it is possible to obtain a stereoscopic display 150 as shown in FIG. 12. It is noted that a reference numeral 160 denotes a viewer.

EXAMPLE 1

One example of the present invention will be described by reference to FIG. 1 showing an optical system of a projector 100. An illumination lens 102 having a focal length f=40 mm, and a diameter of 60 mm was used, and a light valve 103 was located at a position of the front focal length f=40 mm. Herein, a liquid crystal panel having a diagonal size of 12 mm was used as the light valve.

Further, a light-emitting diode array light source 101 was located at a position 80 mm behind the illumination lens 102. The light-emitting diode array light source was so configured that light-emitting diode elements 110 were closely arranged within the circumference of a circle having a diameter of 40 mm as shown by a dotted line of FIG. 14. In the illuminating optical system of this example, the light valve 103 is largely different in size from the light-emitting diode array light source 101 as described above. However, it is illuminated efficiently by the action of the illumination lens 102, and further used in combination with a projection lens 104 having an F-number of 2 to obtain a high optical-efficiency projector 100.

EXAMPLE 2

Another example of the present invention will be described by reference to FIG. 2. An illumination lens 102 having a focal length f=40 mm, and a diameter of 40 mm was used, and a light valve 103 made up of a liquid crystal panel having a diagonal size of 12 mm was located at a position of the front focal length f=40 mm. Further, a light-emitting diode array light source 101 in which light-emitting diode elements were arranged within the circumference of a circle having a diameter of 20 mm was located at a position of the back focal length f=40 mm of the illumination lens 102. Herein, by locating the light-emitting diode array light source at the focus point, it is possible to achieve more efficient illumination. Further, it is possible to shorten the length in the direction of the optical axis, and also reduce the diameters of the light source and the illumination lens as compared with Example 1. Further, a projection lens 104 having an F-number of 2 is used in combination therewith to obtain a high optical-efficiency and compact projector.

EXAMPLE 3

In the present invention, a description will be given to the lumen output of the projector 100 when the distances of the light valve 103 and the light source 101 from the illumination lens 102 have been changed in the foregoing examples.

Figure 15:
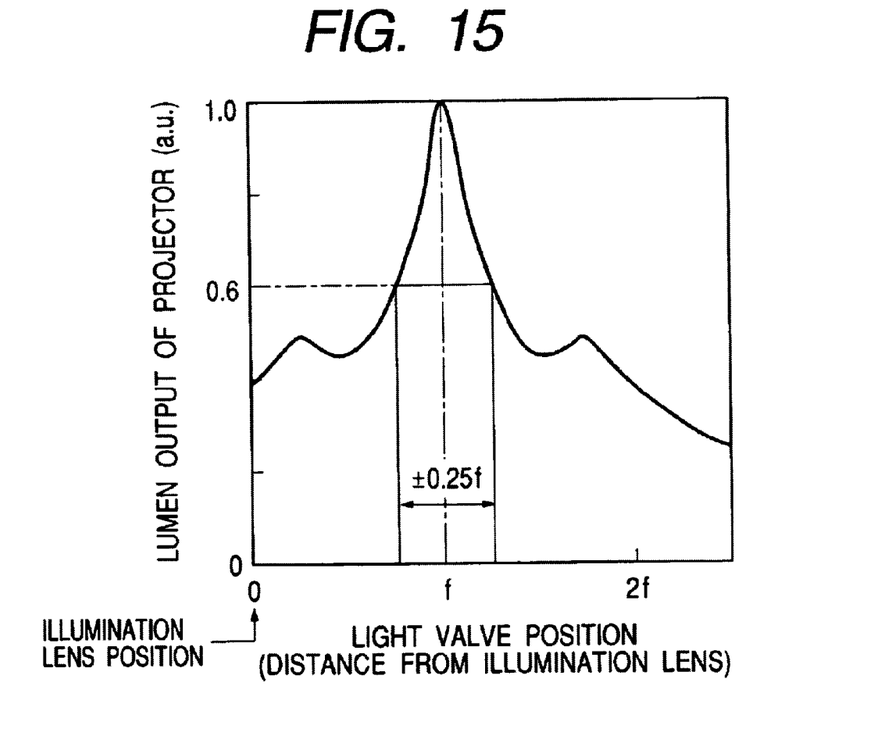
FIG. 15 is a graph showing the relationship between the lumen output and the light valve position in the projector of the present invention.

First, the experimental results when the position of the light valve 103 has been changed are shown in FIG. 15. FIG. 15 indicates as follows. Namely, the maximum lumen output is observed when the light valve 103 is located at a distance of the focal length f from the illumination lens 102. If it is located at this point with a deviation within ±25% from the focal length f, a practically large effect can be obtained.

Then, for the case where the position of the light source 101 has been changed, a description will be separately given to the case where the area of the light source is large as shown in Example 1 and the case where the area of the light source is small as shown in Example 2.

Figure 16:
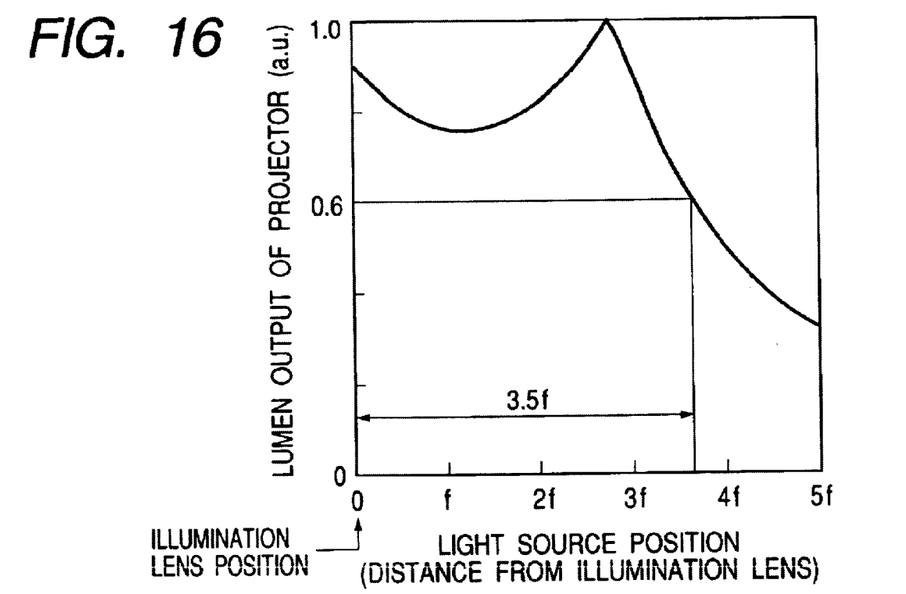
FIG. 16 is a graph showing the relationship between the lumen output and the light source position in the projector of the present invention.

First, FIG. 16 shows the experimental results when the position of the light source 101 has been changed for the large light source area. In this case, FIG. 16 indicates that a large lumen output is obtained when the distance between the light source 101 and the illumination lens 102 falls within a range of from zero to 3.5 times the focal length f.

Figure 17:
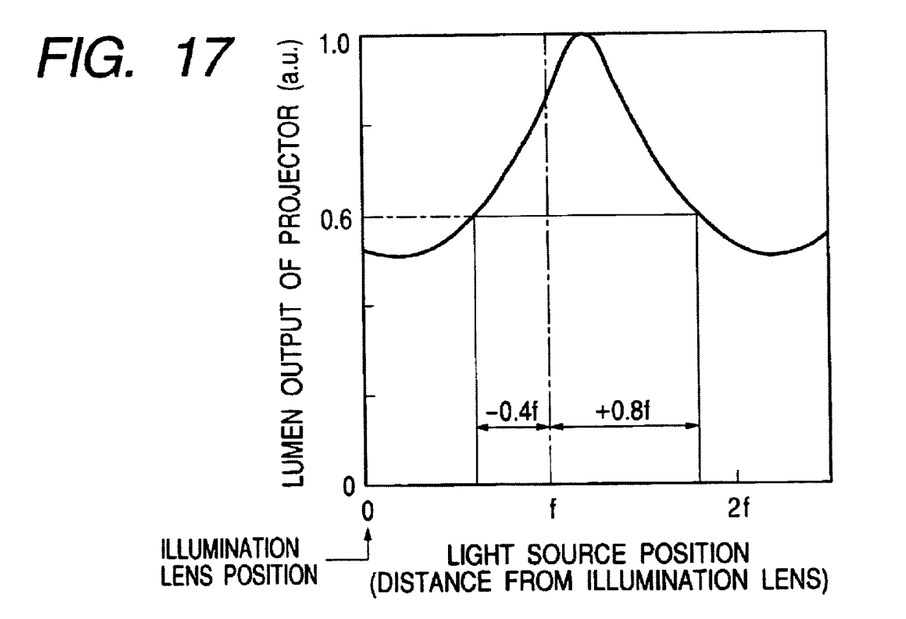
FIG. 17 is a graph showing the relationship between the lumen output and the light source position in the projector of the present invention.

On the other hand, FIG. 17 shows the experimental results when the position of the light source 101 has been changed for the small light source area resulting from downsizing of the projector. In this case, FIG. 17 indicates as follows. Namely, the maximum lumen output is obtained when the light source 101 is located at a distance in the vicinity of the focal length f from the illumination lens 102. If it is located there with a deviation in the range of −40% to +80% from the focal length f, a practically large effect can be obtained.

Herein, whether the area of the light source is large or small is determined by the F-number Fn of the projection lens 104 and the focal length f of the illumination lens 102. The case where the diameter W of the light source satisfies the following expression (7):

$$W > 1.2 f/Fn \qquad (7)$$

corresponds to the large-area light source case. The case where the diameter W satisfies the following expression (8):

$$W \leq 1.2 f/Fn \qquad (8)$$

corresponds to the small-area light source case.

EXAMPLE 4

A display 150 of the present invention will be described by reference to FIG. 12. The projectors 100 described in Example 2 were used as a projector for the right eye 100R and a projector for the left eye 100L. Both the projectors 100R and 100L were respectively located in the left and right directions from a viewer 160 at a binocular distance of about 65 mm. Then, projection was carried out on a directional reflection screen 140 having a screen size of 20 inches, and located 700 mm ahead of the projectors.

Herein, a pair of images which are combined to induce the three-dimensional effect are projected from both the projectors 100R and 100L, respectively. The directional reflection screen 140 is made up of the corner reflector 141 and the anisotropic diffusion mean 142 as shown in FIG. 11. The corner reflector is so configured that the angle formed between adjacent mirrors is 90 degrees. Accordingly, the rays of light incident thereupon are reflected in the direction of incidence for the horizontal direction.

Therefore, for the horizontal direction, the rays of light are collected at the light projected positions of respective projectors. Thus, projected images from respective projectors are respectively viewed with the left and right eyes of a viewer immediately above or immediately under the projectors arranged at the binocular distance as described above. Consequently, a three-dimensional image can be viewed without wearing special glasses. The anisotropic diffusion mean 142 is made up of a lenticular. It diffuses rays of light largely only in the vertical direction, and thereby expand the viewable range in the vertical direction while keeping the directionality in the horizontal direction described above.

Thus, with the display 150 of the present invention, the viewing position is in the vicinity of the projector. For this reason, the projector of the present invention is very suitable because the projector 100 can be reduced in size.

As described in details above, according to the present invention, it was possible to attain the intended purpose of implementing a display providing high optical efficiency regardless of the size of the light valve, and capable of enhancing the uniformity of the luminance of the projected image.

What is claimed is:

1. A display comprising:

a projector including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and a screen for displaying a projected image projected by the projection lens of the projector, wherein the light valve is positioned between the illumination lens and a focus point of the illumination lens deviation range of ±25% away from the focus point, and wherein in the case where the area of the light source is large, satisfying the relationship of the following expression (7):

$$W > 1.2 f/Fn \qquad (7)$$

where Fn denotes the F-number of the projection lens, f denotes the focal length of the illumination lens, and W denotes the diameter of the light source, the light source is positioned at a distance in the range of from zero to 3.5 times the focal length f of the illumination lens away from the illumination lens.

2. The display according to claim 1, wherein the light source comprises light-emitting diodes arranged in a one-dimensional or two-dimensional array.

3. The display according to claim 1, wherein the screen is formed to diffuse reflection thereon.

4. A display comprising:

a projector including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and a screen for displaying a projected image projected by the projection lens of the projector, wherein the light valve is positioned between the illumination lens and a focus point of the illumination lens with a deviation range of ±25% away from the focus point, and wherein in the case where the area of the light source is small, satisfying the relationship of the following expression (8):

$$W \leq 1.2f/Fn \tag{8}$$

where Fn denotes the F-number of the projection lens, f denotes the focal length of the illumination lens, and W denotes the diameter of the light source, the light source is positioned at a distance of the focal length C of the illumination lens with a deviation in the range of from −40% to +80% away from the illumination lens.

5. The display according to claim 4, wherein the light source comprises light-emitting diodes arranged in a one-dimensional or two-dimensional array.

6. The display according to claim 4, wherein the screen is formed to diffuse reflection thereon.

7. A display comprising:
a projector including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and
a screen for displaying a projected image projected by the projection lens of the projector,
wherein the light valve is positioned between the illumination lens and a focus point of the illumination lens with a deviation range of ±25% away from the focus point,
wherein the light source is positioned away from the illumination lens at a distance in the range of 0–3.5 times of a focal length of the illumination lens at the opposite side to the focus point on which the light valve is located, and
wherein the following expression is satisfied:

$$\alpha H \geq \arctan\ (dH/2f),$$

where dH denotes the horizontal width of the light valve, f denotes the focal length of the illumination lens, and αH denotes the angle of radiation in the horizontal direction at each point of the light source.

8. The display according to claim 7, wherein the light source comprises light-emitting diodes arranged in a one-dimensional or two-dimensional array.

9. The display according to claim 7, wherein the screen is formed to diffuse reflection thereon.

10. A display comprising:
a projector including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and
a screen for displaying a projected image projected by the projection lens of the projector,
wherein the light valve is positioned between the illumination lens and a focus point of the illumination lens with a deviation range of ±25% away from the focus point,
wherein the light source is positioned away from the illumination lens at a distance in the range of 0–3.5 times of a focal length of the illumination lens at the opposite side to the focus point on which the light valve is located, and
wherein the following expression is satisfied:

$$\alpha V \geq \arctan\ (dV/2f),$$

where dV denotes the vertical width of the light valve, f denotes the focal length of the illumination lens, and αV denotes the angle of radiation in the vertical direction at each point of the light source.

11. The display according to claim 10, wherein the light source comprises light-emitting diodes arranged in a one-dimensional or two-dimensional array.

12. The display according to claim 10, wherein the screen is formed to diffuse reflection thereon.

13. A stereoscopic display comprising:
a left and right pair of projectors each including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and
a screen for displaying respective projected images projected by the projection lenses of the pair of the projectors on the same panel,
wherein the light valve is positioned between the illumination lens and a focus point of the illumination lens with a deviation range of ±25% away from the focus point, and
wherein in the case where the area of the light source is large, satisfying the relationship of the following expression (7):

$$W > 1.2f/Fn \tag{7}$$

where Fn denotes the F-number of the projection lens, f denotes the focal length of the illumination lens, and W denotes the diameter of the light source, the light source is positioned at a distance in the range of from zero to 3.5 times the focal length f of the illumination lens away from the illumination lens.

14. The display according to claim 13, wherein the light source comprises an array of light-emitting diodes arranged at least in two or more different directions in combination.

15. The display according to claim 14, wherein the screen comprises a corner reflector, and an anisotropic diffusion means for causing wider diffusion in a direction parallel to a ridgeline of the corner reflector than in a vertical direction.

16. A display comprising the projector according to claim 13, wherein the screen is formed to diffuse reflection thereon.

17. The display according to claim 16, wherein the screen comprises a corner reflector, and an anisotropic diffusion means for causing wider diffusion in a direction parallel to a ridgeline of the corner reflector than in a vertical direction.

18. A stereoscopic display comprising:

a left and right pair of projectors each including a light source extending at least one-dimensionally or two dimensionally, an illumination lens through which a luminous input flux emitted from the light source passes, a light valve for modulating the luminous input flux passed through the illumination lens, and a projection lens for projecting the luminous input flux modulated at the light valve; and a screen for displaying respective projected images projected by the projection lenses of the pair of the projectors on the same panel, wherein the light valve is positioned between the illumination lens and a focus point of the illumination lens with a deviation range of ±25% away from the focus point, and wherein in the case where the area of the light source is small, satisfying the relationship of the following expression (8):

$$W < 1.2 f/Fn \qquad (8)$$

where Fn denotes the F-number of the projection lens, f denotes the focal length of the illumination lens, and W denotes the diameter of the light source, the light source is positioned at a distance of the focal length f of the illumination lens with a deviation in the range of from −40% to 80% away from the illumination lens.

19. The display according to claim 18, where the light source comprises an array of light-emitting diodes arranged at least in two or more different directions in combination.

20. The display comprising the projector according to claim 18, wherein the screen is formed to diffuse reflection thereon.

21. A stereoscopic display comprising:

a left and right pair of projectors each including a light source extending at least one-dimensionally or two-dimensionally, an illumination lens through which a luminous input flux emitted from the light source passes, a light valve for modulating the luminous input flux passed through the illumination lens, and a projection lens for projecting the luminous input flux modulated at the light valve; and a screen for displaying respective projected images projected by the projection lenses of the pair of the projectors on the same panel, wherein the light valve is positioned between the illumination lens and a focus point of the illumination lens with a deviation range of ±25% away from the focus point, and wherein the following expression is satisfied:

$$\alpha \geq V \arctan(dV/2t),$$

where dV denotes the vertical width of the light valve, f denotes the focal length of the illumination lens, and $\alpha V$ denotes the angle of radiation in the vertical direction at each point of the light source.

22. The display according to claim 21, wherein the light source comprises and array of light-emitting diodes arranged at least in two or more different directions in combination.

23. The display comprising the projector according to claim 21, wherein the screen is formed to diffuse reflection thereon.

* * * * *